United States Patent [19]

Pultman

[11] 4,449,750

[45] May 22, 1984

[54] ACCESSORIES FOR WHEELCHAIRS AND THE LIKE

[76] Inventor: Martin D. Pultman, 550 Coeur De Royale Dr., St. Louis, Mo. 63141

[21] Appl. No.: 416,268

[22] Filed: Sep. 9, 1982

[51] Int. Cl.$^3$ .......................... A47C 7/62; B60R 11/00

[52] U.S. Cl. ...................................... 297/188; 108/44; 135/67; 224/42.43; 224/273; 224/42.46 R; 280/289 WC; 297/5; 297/149; 297/153; 297/DIG. 4; 312/237; 312/290

[58] Field of Search .................... 108/44, 47; 297/153, 297/194, 149, DIG. 4, 5, 188; 312/250, 237, 194, 290; 248/225.3 R; 224/30 R, 273, 42.43, 42.44, 42.46 R; 280/289 WC; 220/84; 135/67

[56] References Cited

U.S. PATENT DOCUMENTS

| | | | |
|---|---|---|---|
| D. 184,040 | 12/1958 | Crockett | 297/194 X |
| 915,802 | 3/1909 | Smith | 220/84 |
| 1,394,224 | 10/1921 | Scott | 135/67 X |
| 1,566,545 | 12/1925 | Larson | 312/290 X |
| 1,573,466 | 2/1926 | Ward | 312/290 X |
| 2,521,572 | 9/1950 | Eckel et al. | 312/290 X |
| 2,655,882 | 10/1953 | Tripp | 220/84 X |
| 2,745,465 | 5/1956 | Hogan | 297/DIG. 4 |
| 3,113,817 | 12/1963 | Imel | 312/290 X |
| 3,239,272 | 3/1966 | Wilkins | 297/194 |
| 3,572,873 | 3/1971 | Hartins, Jr. | 312/290 |
| 3,606,450 | 9/1971 | Sedswick | 297/153 X |
| 3,759,569 | 9/1973 | Bennet | 297/DIG. 4 X |
| 4,074,683 | 2/1978 | DiChiang | 135/67 |
| 4,184,618 | 1/1980 | Jones | 297/5 X |
| 4,339,061 | 7/1982 | Dunn | 224/273 X |

*Primary Examiner*—Allan N. Shoap
*Attorney, Agent, or Firm*—Kalish & Gilster

[57] ABSTRACT

Container accessories are configured for removable securement to mobility aids such as walkers, wheelchairs or the like with tubular frame members. Each accessory includes a framework and panel members supported by the framework to define at least one compartment, the framework being self-supporting. Both the framework and panel members are of strong, lightweight material, e.g., aluminum. Resilient spring clips are carried by the framework at locations thereon for supporting the framework from the frame members of the aid by engaging its tubular frame members. For use with a walker, the accessory is preferably multiply compartmented and engages a cross member of the walker. For use with wheelchairs, frame components of the accessory framework are adjustable and reconfigurable to permit engagement of arm support members of the wheelchair, even though of different possible frame configurations, at the front or at the side of the wheelchair.

8 Claims, 20 Drawing Figures

ACCESSORIES FOR WHEELCHAIRS AND THE LIKE

BACKGROUND AND SUMMARY OF THE INVENTION

This invention relates to containers or carriers for wheelchairs, walkers or other similar mobile devices particularly intended for use by the disabled.

Users of wheelchairs and invalid walkers are confronted with a difficult problem when transporting items such as groceries, books and other personal property which able-bodied individuals often carry in their arms. Those who use wheelchairs or walkers are compelled to propel the wheelchair or grip the walker by hand and thus cannot conveniently carry items in their arms. A wheelchair user can place items on his or her lap but this is inconvenient, awkward and provides only a most limited storage capability. The problem is especially severe for wheelchair users when shopping where it is difficult (or impossible for some persons) to push a grocery cart in front of the wheelchair. The user of a walker is even more limited, there being no capability of carrying anything except a purse or the like which can be carried across one's shoulder.

Furthermore, there are many different configurations of wheelchairs and walkers which make it difficult for the equippage of same with a basket or other container. Walkers are constructed with various different geometry although typical one or more bars extends transversely across the front of the device, there being side grips or side bars for handling of the walker. Wheelchairs similarly are available for various different geometry. Other than armless or similar wheelchairs specifically intended for athletic competition, there are available two principal types of conventional configurations which have arms at the sides supported by vertical tubular supports. In one such type of chair the front arm supports rise vertically from the small auxiliary wheels provided at the front of the chair. In the other type of chair, the framework provides vertical supports for the arms with rearwardly offset portions immediately below the arms to permit the chair to be moved across to a desk or table. These different configurations compound the difficulty of designing a container accessory for wheelchairs. Heretofore, container accessories for wheelchairs have been of extremely limited size and have not been capable of use with wheelchairs of such different configurations.

It is an object of the invention to provide improved containers, or what may be termed carriers, for wheelchairs, walkers or the like.

It is an object of the invention to provide such container accessories of a generally universal character which can be removably secured to various different configurations of wheelchairs, being universally and readily adjusted for securement to most wheelchairs regardless of their arm support configuration.

It is also an object of the invention to provide such container accessories which greatly increase storage capacity over that previously known yet which do not interfere with the normal use or function of wheelchairs.

It is also an object of the invention to provide an improved container accessory utilizable specifically with walkers which greatly increases storage capacity over that provided by previous devices of such character, yet which does not seriously interfere wih the balance and use of a walker.

Another object of the invention is the provision of such containers which are of extremely lightweight, strong construction so as to provide long lasting reliable use but without adding objectionably to the weight of a wheelchair or walker.

A further object of this invention is the provision of such a container for use with wheelchairs which serves the dual purpose of holding items while providing a desklike writing and work surface for the user.

Among other objects of the invention may be noted the provision of such accessories which are readily installed and removed; which are maintenance free; and which provide the use with hitherto unavailable ease and convenience of use.

Other objects and features will be in part apparent and in part pointed out hereinbelow. However, briefly, it will be noted that the invention is concerned with container accessories which are configured for removable securement to a mobility aid such as a walker, wheelchair or the like having tubular frame members. The accessory embodiments each include a framework and panel members supported by the framework to define at least one compartment, the framework being self-supporting. Both the framework and panel members are of strong, lightweight material, such as aluminum. Resilient spring clips are carried by the framework at locations thereon for supporting the framework from the frame members of the aid by engaging its tubular frame members. For use with a walker, the accessory is preferably multiply compartmented and engages a cross member of the walker. For use with wheelchairs, frame components of the accessory framework are adjustable and reconfigurable to permit engagement of arm support members of the wheelchair even though of different possible frame configurations.

BRIEF DESCRIPTION OF THE DRAWINGS

Corresponding reference characters indicate corresponding parts throughout the several views of the drawings.

DESCRIPTION OF THE PREFERRED EMBODIMENTS

Figure 1:
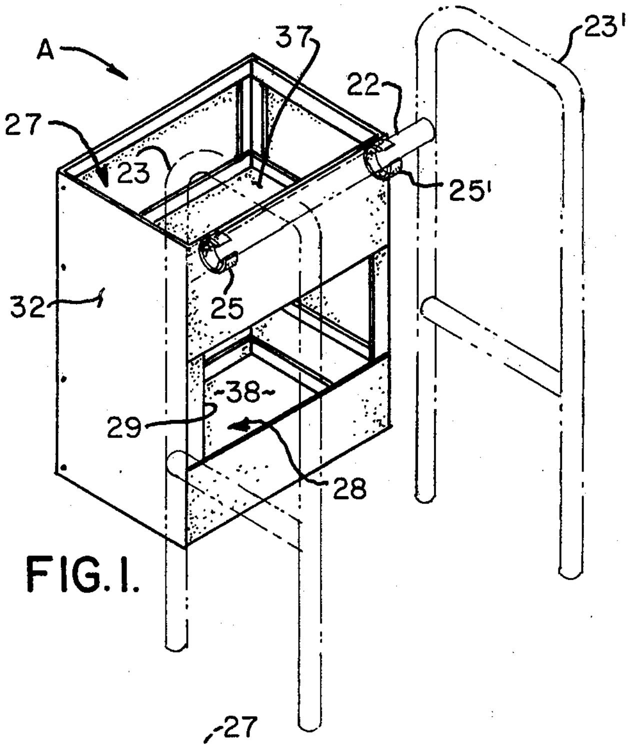
FIG. 1 is a perspective view of a first embodiment of a container accessory constructed in accordance with and embodying the present invention, which embodiment is specifically utilizable with a walker.
Figure 2:
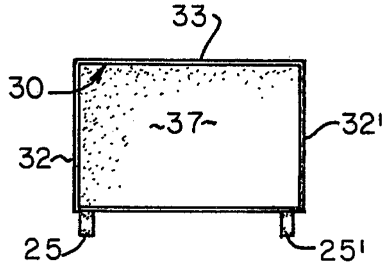
FIG. 2 is a top plan view of the accessory of FIG. 1.
Figure 3:
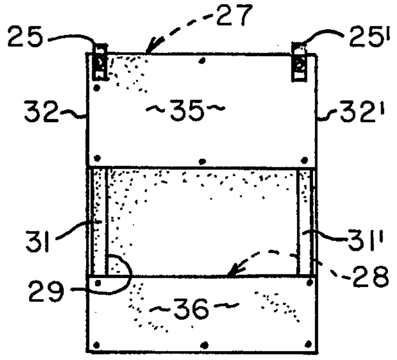
FIG. 3 is a rear elevation of the accessory of FIG. 1.
Figure 4:
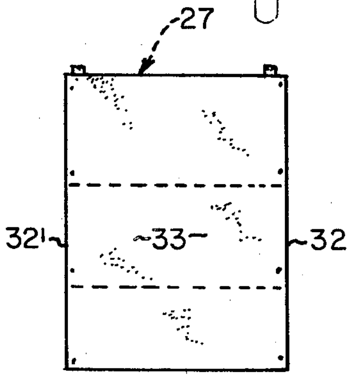
FIG. 4 is a front elevation view thereof.
Figure 5:
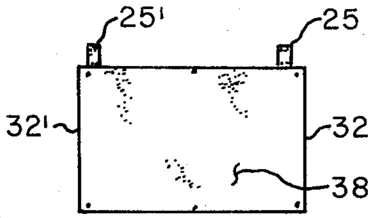
FIG. 5 is a bottom plan view of this accessory.
Figure 6:
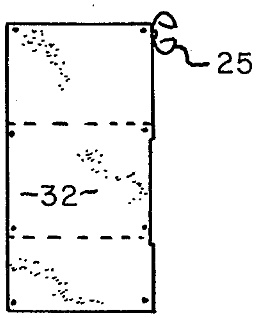
FIG. 6 is a left side elevation of the accessory of FIG. 1.
Figure 7:
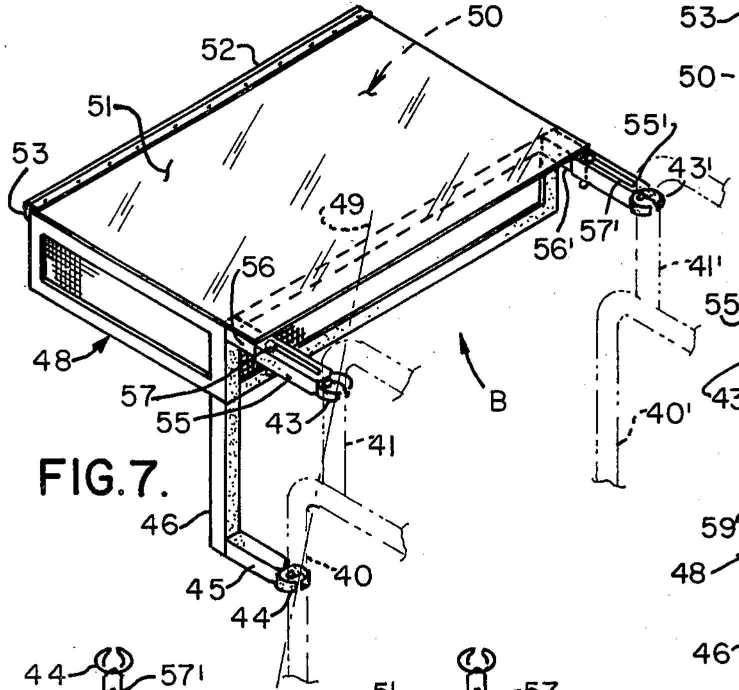
FIG. 7 is a perspective view of a second container accessory embodiment of the invention, as specifically configured for securement at the front of a wheelchair.
Figure 8:
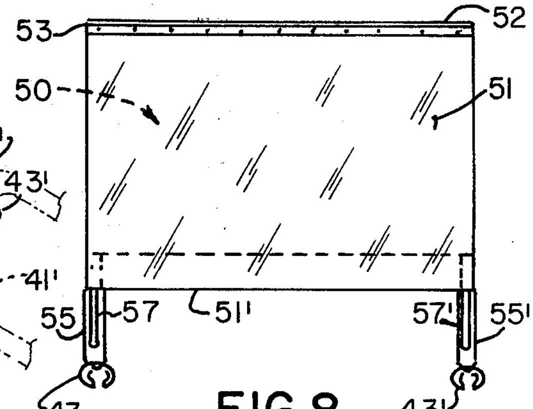
FIG. 8 is a top plan view of the accessory of FIG. 7.
Figure 9:
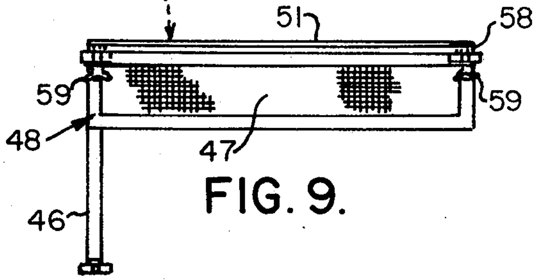
FIG. 9 is a rear elevation view of the accessory of FIG. 7.
Figure 10:
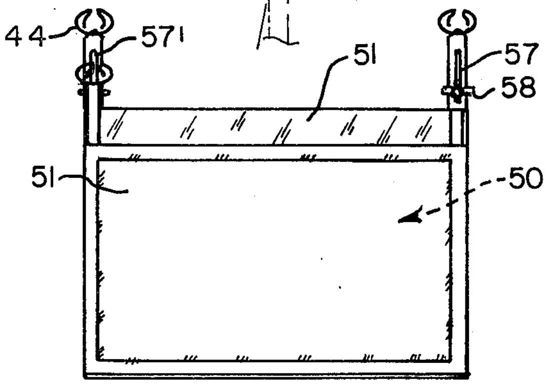
FIG. 10 is a bottom plan view of the accessory of FIG. 7.
Figure 11:
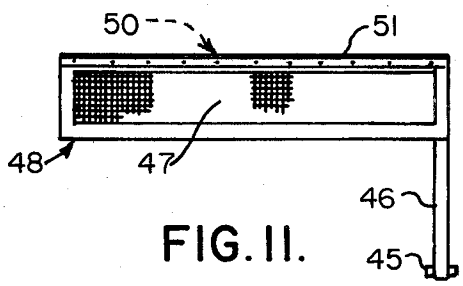
FIG. 11 is a front elevation of the accessory of FIG. 7.
Figure 12:
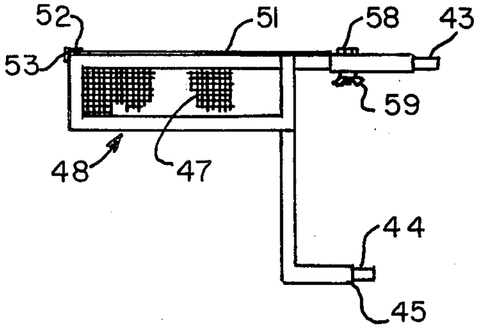
FIGS. 12 and 13 are left and right side elevations, respectively, of the embodiment of FIG. 7.
Figure 13:
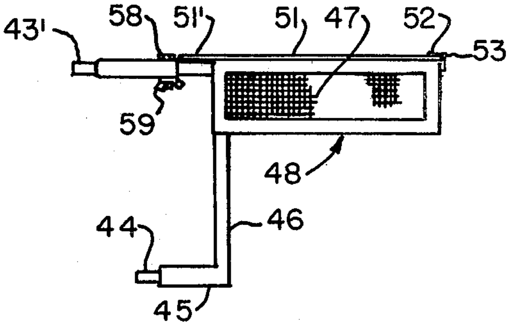
Figure 14:
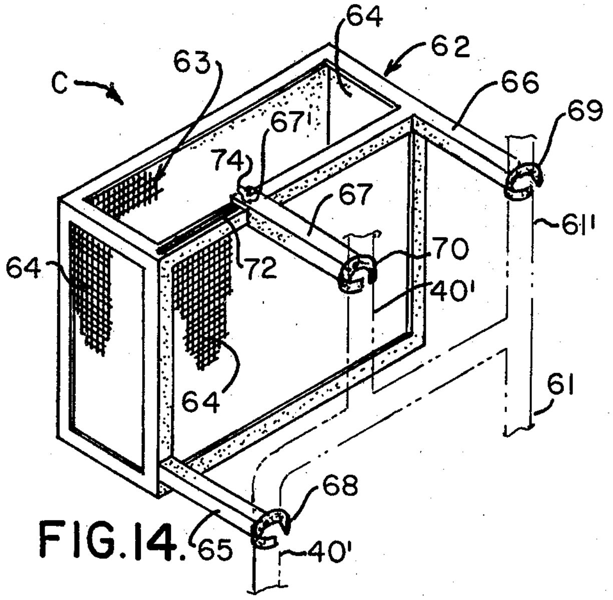
FIG. 14 is a perspective view of a third embodiment of a container accessory constructed in accordance with and embodying the invention.
Figure 15:
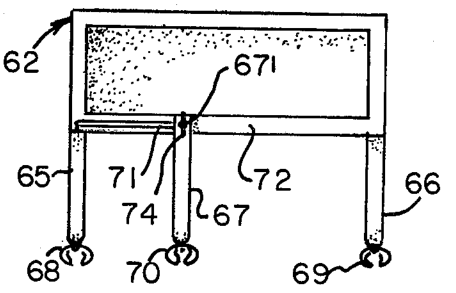
FIG. 15 is a top plan view thereof.
Figure 16:
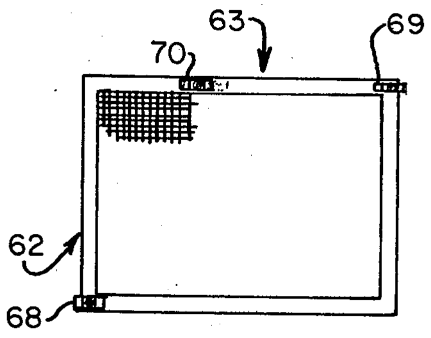
FIG. 16 is a left side elevation of the accessory of FIG. 14.
Figure 17:
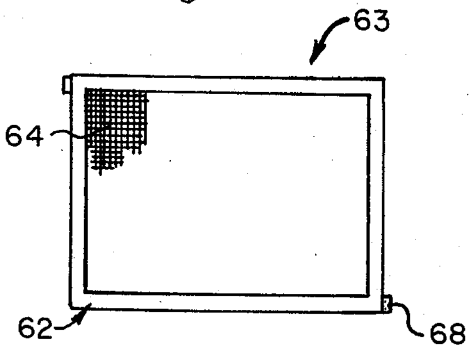
FIG. 17 is a right side elevation of this embodiment.
Figure 18:
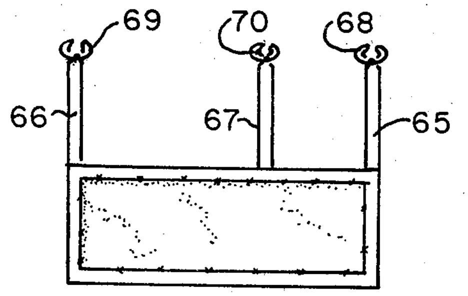
FIG. 18 is a bottom plan view of this embodiment.
Figure 19:
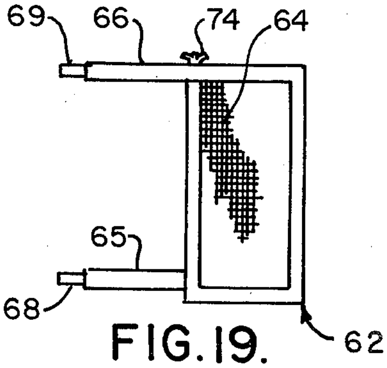
FIGS. 19 and 20 are rear and front elevations, respectively, of this third embodiment.
Figure 20:
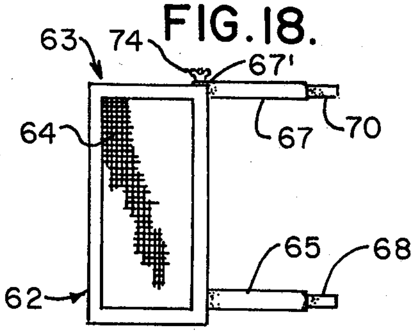

Referring now by reference characters to the drawings, which show three different embodiments of container accessories for securement to walkers, wheelchairs and similar mobility aids for those with disabilities, FIG. 1 illustrates generally at A a first embodiment of a container accessory of the invention, as intended for use with a walker or similar ambulatory aid. The walker, generally 21, is of the type having the usual cross-bar 22 which extends across a framework having side grips 23, 23' for being gripped by the user, who stands between the grips to the rear of bar 22 and advances the walker by moving it forwardly in increments. Container accessory A is configured for being removably secured to cross-bar 22 and for this purpose is provided with spring clips 25, 25' at opposite sides adjacent the top of the container accessory.

Generally, accessory A is provided with upper and lower bins 27, 28, stacked one above the other, with access to the lower bin 28 being had through a rectangular opening 29. The configuration of accessory A is, itself, rectangular, being provided by a framework, generally 30, of joined aluminum framework members, as representatively at 31, 31', on which are provided metal panels which enclose the device and define therein the bins 27, 28.

Preferably, although not necessarily, the construction of framework 30 may utilize aluminum L-section channel stock or bar stock as is welded or pop-riveted, etc. together to provide a strong, integral frame, on which the panels (which also may be of aluminum but of thin sheet meterial) may be suitably secured as also by welding or pop-riveting. Thus, there are provided left and right side walls 32, 32' and a front wall 33 extending the full height of the accessory but with upper and lower rear wall panels 35, 36 which provide opening 29 therebetween for access to the lower bin 28. Similar sheet material defines the floor of each bin, as at 37 and 38. Opening 29 opens conveniently in front of the user.

The resultant construction is of high strength but very lightweight to avoid interference with the normal function of walker 21 and avoiding objectionable addition to the weight of the walker such as would disturb its balance or prevent its convenient use.

The manner of usage of accessory A is manifest. The user secures the accessory to the walker by permitting spring clips 25, 25' to resiliently engage cross-bar 22. When the unit is engaged in this manner to a walker, the upper bin 27 is conveniently disposed for receiving items from above, being located immediately in front of the user. For example, a shopper may conveniently place items in the top bin, while transporting personal items, such as a purse, pocketbook, etc. in the lower bin 28, safely out of sight.

Referring now to FIGS. 7–13, a second embodiment B provides an accessory of the invention which is specifically configured for removable securement at the front of a wheelchair (not shown) but which representatively is provided with a framework, portions of which are shown in phantom, including vertical front frame members 40, 40' from which extend vertical arm support components or members 41, 41' which are rearwardly offset to permit the wheelchair to more closely approach a table or work surface than otherwise. However, many wheelchairs exist in which arm support members are aligned with, or constitute vertical extensions of front frame members corresponding to those at 40, 40'. Embodiment B can be used with either type of wheelchair.

Unit B has the configuration of a desk while providing also a compartment, as more fully described below, for receiving various items, being attachable to the wheelchair in front of the user to provide a working or writing surface for the user.

As in the case of embodiment A, spring clips 43, 43' are provided at opposite sides of the unit proximate its upper end, being thus located above the center of gravity of the unit, for removable securement to the wheelchair by resiliently gripping its tubular frame members 41, 41'. A third spring clip 44 is located at the lower left of the framework of unit B, being carried at the end of a lateral extension 45 of a depending leg 46 which is provided in integral relationship with the framework proper of the unit, as designated generally at 48, on which are carried various panels such as those designated 47. Clip 44 is positioned, accordingly, for engaging frame member 40 at a location relatively well below the seat of the wheelchair and also below the center of gravity of unit B. It is noted that only one such lower support preferably is provided, permitting unit B to be swung out of the way for allowing the user to more readily leave and enter the wheelchair, with swinging movement being illustrated by an arrow and wherein the unit is thus swingable upon a pivot axis 49 through clips 43, 44. The provision of a lower support on the right side of the unit would be seen to interfere with the user during maneuvering in or out of the wheelchair.

More specifically, framework 48 is provided, like that of accessory A, by joined aluminum framework members which may be of L-section channel or bar stock appropriately welded, pop-riveted, or otherwise strongly united to provide an integral frame having great strength and yet which is in actuality quite light even though self-supporting. Framework 48 together with panels 47 define a rectangular enclosure compartment 50 which is covered by a transparent cover 51 such as preferably formed of "Plexiglass" synthetic resin material to provide a strong, lightweight surface of smooth, uninterrupted character, as appropriate for a good writing desk. Cover 51 is secured at its forward edge by a hinge 52 running the width of the unit, permitting cover 51 to be swung upwardly away from the user for access to compartment 50. Yet, because of its transparent character, cover 51 allows the user to keep in view various items placed within compartment 50.

It is noted that the axis 53 of hinge 52 is located forwardly of the structure of framework 48. This permits cover 51 to be swung completely forwardly and to hang substantially vertically from hinge 52 and, accordingly, out of the way for unencumbered access to compartment 50, as during shopping or otherwise when it is desired to keep cover 51 open for repeated access to compartment 50.

The wall-forming panels 47 may be of various materials such as aluminum sheet material, perforated aluminum sheet metal, screen or one of a variety of suitable synthetic resin materials which will allow the weight of the unit to be kept low while preserving the overall strength and utility of the unit. In a preferred form of the invention, perforated aluminum sheeting is employed, having additional advantage of providing ventilation to the interior of compartment 50, the sheeting being suitably pop-riveted in place, for example.

Unit B is configured for quick reconfiguration for attachment to the previously noted other type of wheelchair wherein the arm support members extend vertically above and in alignment with frame members 40, 40'. For this purpose, clips 43, 43' are provided upon framework extensions 55, 55' which are extendable, being constituted of rectangular tubing fitted in telescoping relationship upon corresponding rectangular tubing extensions 56, 56' of slightly smaller section which extend rearwardly from framework 48. Extensions 55, 55' are provided with slots, as at 57, 57', and through which extend bolts and wing nuts, as at 58, 59, to permit the user to readily extend or retract extensions 55, 55' for the desired positioning of clips 43, 43' relative to the wheelchair frame members to orient unit B properly regardless of the relative dimensions of the wheelchair or location of its arm support members 41, 41'. This also permits appropriate adjustment of the angle of the cover 51 relative to the user and proper location of the rearward edge of the cover, as designated at 51', relative to the user.

Referring now to FIGS. 14–20, a further embodiment C provides a container accessory also adapted for removable securement to a wheelchair but at the side thereof. For this purpose, observe that at the right side of the wheelchair there is an addition to front vertical frame member 40' a rear vertical frame member 61, including an arm support extension thereof 61', it being understood that the arm (not shown) of the wheelchair bridges members 40', 61' at their upper end.

The framework of embodiment C, as designated generally at 62, is, as in the case of embodiment B, provided by integrally joined frame members such as of aluminum L-section channel or bar stock to form a rectangular compartment 63 which is enclosed around its sides and bottom by panels 64 of the same general type as panels 47 of embodiment B.

Lateral extensions 65, 66 and 67 of rectangular tubing have at their outer extremities spring clips 68, 69 and 70, respectively, for resiliently engaging the tubular frame members of the wheelchair. Here, it is noted also that, as in the case of embodiment B, there are two upper points of connection to the wheelchair and only a single lower point of connection thus provided by the spring clips.

Manifestly, extensions 66, 67 are located above the center of gravity of accessory C and permit the self-supporting framework 62 to be suspended by two points of attachment to the frame members of the wheelchair, while only the single lower extension 65 is necessary to properly space accessory C to the side of the wheelchair at a location where it will not interfere with the user's access to the wheel ring at the side of the wheelchair. In this regard, adequate spacing is provided between the wheelchair frame members and the adjacent inner surface of accessory C for both the associated wheel of the chair and for room to place one's arm between the accessory and wheel ring.

Since the wheelchair may be of either of the preferred configurations noted above, accommodation is made for the relocation forwardly and rearwardly of lateral extension 67, extensions 65, 66, 67 always remaining parallel. For this purpose, a longitudinal slot 71 is provided in an upper frame member 72. Extension 67 is provided with a tab 67' which rides on the upper surface of member 72. A bolt including a wing nut 74 extends through tab 67' and slot 71 to permit the user to tighten the assembly for maintaining a secured position for extension 67, which can otherwise be shifted back and forth as desired for proper alignment with the wheelchair front arm member 40', no matter which wheelchair configuration.

In this way, a universal accessory is provided for accommodating most of the various wheelchairs on the market today, thereby allowing the manufacture of but a single unit which can fulfill a variety of user needs. The deep, rectangular configuration of compartment 63 allows ample storage and, for the first time, provides a carrier accessory for wheelchairs which is sufficiently commodious to receive large numbers of items as when shopping.

In addition to the foregoing advantages, it will be apparent that a wheelchair can be simultaneously equipped with both units B and C, thereby further increasing storage capability. Although unit C is shown as configured for securement to the right side of a wheelchair, it should be apparent that its manufacture can easily be realized to provide what is, in effect, a mirror image configuration which can be secured to the left side of the wheelchair. Thus, it is within the purview of the invention to provide matched right and left side units. A wheelchair may be simultaneously equipped with both such units to enhance symmetry and balance and still further increase the storage capability.

Although the foregoing includes a description of the best mode contemplated for carrying out the invention, various modifications are contemplated.

As various modifications could be made in the constructions herein described and illustrated without departing from the scope of the invention, it is intended that all matter contained in the foregoing description or shown in the accompanying drawings shall be interpreted as illustrative rather than limiting.

What is claimed is:

1. A container accessory for a walker or like mobility aid having a transversely extending tubular frame member located at the front of the user, said accessory comprising a framework and parallel members supported by said framework to define upper and lower rectangular compartments located in aligned over-and-under relationship one above the other, the upper compartment being open at the top, to define a rectangular upper opening facing upwardly in front of the user, the lower compartment being of bin-like configuration and defining a rectangular lower opening facing rearwardly toward the user in always open condition, the lower compartment being closed entirely on three sides by side wall panels and a front wall panel but being only partly closed rearwardly by a rear wall panel extending below said lower opening, whereby a major extent of said lower compartment is located below said lower opening for reliable containment of items, the lower opening thereby being presented to the user for permitting access to said lower compartment only by the user while concealing said lower compartment for out-of-sight containment of items, said framework and panel members being of strong, lightweight material for avoiding objectionable addition to the weight of the walker such as would disturb its balance or prevent its convenient use as a mobility aid, and resilient securement means for removable resilient securement of the container accessory to said transversely extending tubular frame members with said container accessory located in front of the user and with said upper compartment opening proximate said tubular frame member, said resilient securement means comprising at least first and second spring clips carried by said container accessory at a location above the center of gravity of said accessory for suspending of said accessory from said transversely extending tubular frame member, said spring clips being located at opposite sides of said rear wall proximate the opening of said upper compartment for resiliently gripping said transversely extending tubular frame member, thereby to reliably support said accessory.

2. A container accessory for removable securement to a wheelchair having first and second tubular frame members, said accessory comprising a framework and panel members supported by said framework to define at least one compartment, said framework being self-supporting, said framework and panel members being of strong, lightweight material, and at least first and second resilient securement means carried by said framework at locations upon said framework for resiliently engaging portions of said tubular frame members to cause said framework to be reliably supported by said tubular frame members, said resilient securement means comprising respective spring clips, said spring clips being located above the center of gravity of said accessory for suspending of said accessory from said tubular frame members, first and second ones of said spring clips resiliently engaging respective first and second ones of said tubular frame members for suspending said accessory above said center of gravity, said framework including a lower extension member below said center gravity for extending laterally toward said wheelchair, said extension member having an outer end carrying a third spring clip for resiliently gripping a tubular frame member of said wheelchair to maintain said accessory in stable orientation spaced from said wheelchair.

3. A container accessory for a mobility aid according to claim 2 and further characterized by said framework having first and second upper extension members for extending laterally toward said wheelchair and having outer ends respectively carrying said first and second spring clips, at least one of which extension members is adjustable in orientation relative to said framework for permitting securement to said wheelchair when of various wheelchair configurations.

4. A container accessory for a mobility aid according to claim 3 and further characterized by said accessory being intended for being carried at the side of said wheelchair, said at least one extension member being an upper extension member slidably affixed to said framework for being adjustably movable toward or away from the other upper extension member in parallel relationship for alignment with tubular frame members of said wheelchair, and tightenable means for fixing the position of said slidable upper extension member relative to the other upper extension member.

5. A container accessory for a mobility aid according to claim 3 and further characterized by said accessory being intended for being carried at the front of said wheelchair, both said upper extension members being of adjustable length.

6. A container accessory for a mobility aid according to claim 5 and further characterized by said upper extension members being of telescoping construction, and respective tightenable means for fixing the length of each of said upper extension members.

7. A container accessory for a mobility aid according to claim 5 and further characterized by a cover extending across the top of said framework to cover said compartment and to provide a desk-like writing or working surface in front of the user of said wheelchair, said cover being hingedly secured to said framework.

8. A container accessory for a mobility aid according to claim 7 and further characterized by said cover being hinged at the front of said framework for pivoting movement relative to said framework for being swung open to a position suspended from the hinge axis.

* * * * *